April 23, 1929.  J. H. KINTZELE  1,710,093
LUGGAGE CARRIER
Filed April 8, 1927
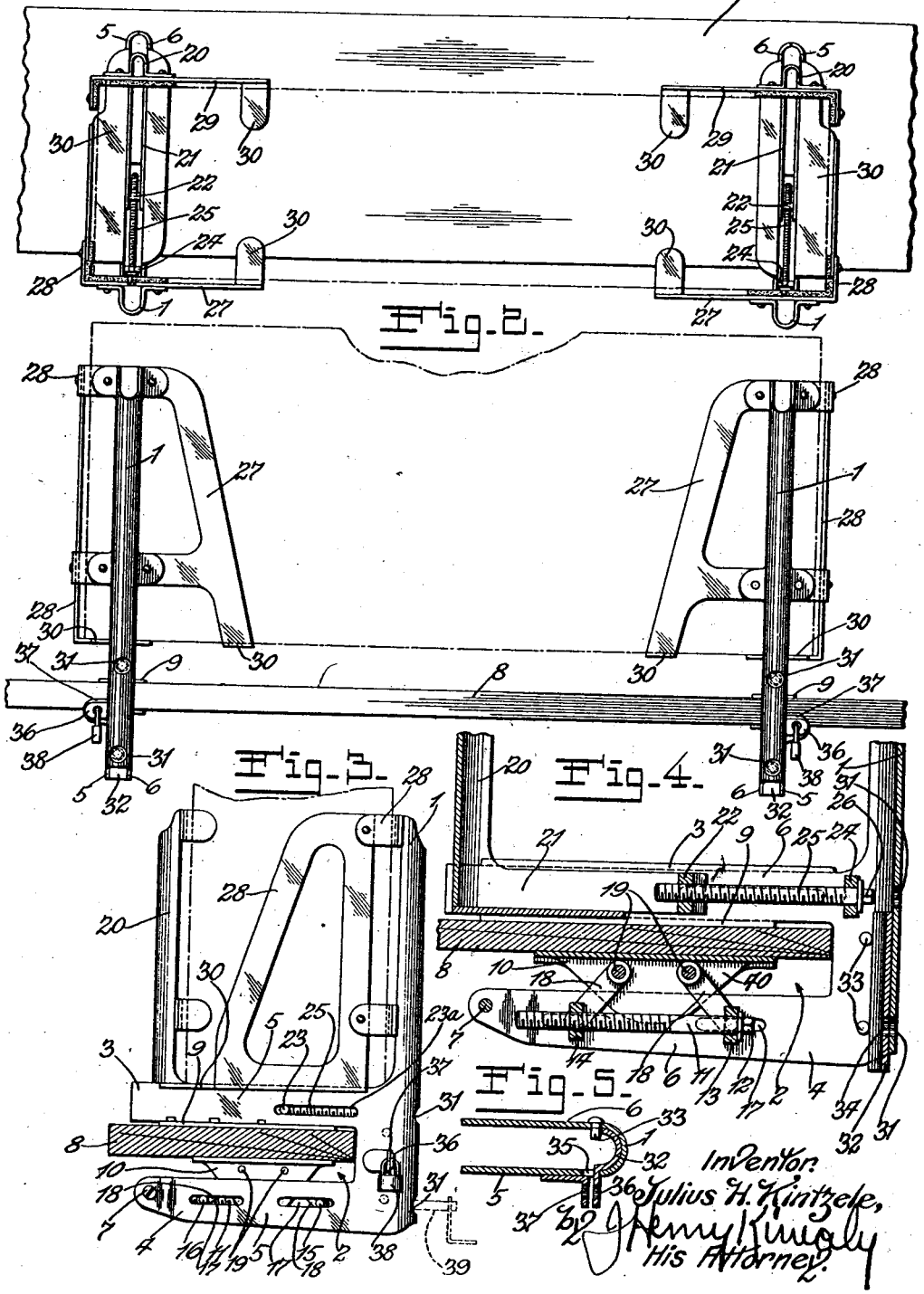

Patented Apr. 23, 1929.

1,710,093

UNITED STATES PATENT OFFICE.

JULIUS H. KINTZELE, OF ST. LOUIS, MISSOURI.

LUGGAGE CARRIER.

Application filed April 8, 1927. Serial No. 182,068.

My invention relates to luggage carriers and more particularly to luggage carriers which are adapted to be attached to the running board of an automobile to hold luggage in place thereon.

Heretofore a great number of carriers of this type have been designed but they have had one or all of four deficiencies of structure and, therefore, have been impractical in use. In the first place the luggage carriers heretofore made have allowed the luggage to rest directly on the running board of the automobile and, therefore, in wet weather water would accumulate under the luggage and on top of the running board and would eventually soak through into the trunk, suitcase or other piece of luggage being carried. Secondly, no adequate way was provided for attaching the carrier to the running board of an automobile. Various types of clamps and arrangements of parts have been tried but all of the expedients resorted to have either been ineffective in holding the carrier in position on the running board or, if they were effective to do this, it was almost impossible to quickly remove the carrier from the running board after it has been clamped in place. Thirdly, no efficient way was provided for holding the luggage in the carrier and for adjusting the carrier to accommodate pieces of luggage of various sizes. Fourthly, no way was provided whereby the carrier could be locked on the running board and the luggage could be locked in the carrier so that the luggage cold not be stolen.

The objects of my invention are to obviate each and every one of the deficiencies in structure set forth.

One embodiment of my invention is fully shown in the accompanaying drawings wherein similar characters are used to designate similar parts: Fig. 1 is a top view of a running board of an automobile with a pair of luggage carriers attached thereto; Fig. 2 is an elevation of the device shown in Fig. 1; Fig. 3 is a section through the running board showing the device in place thereon; Fig. 4 is a sectional view of the carrier; and Fig. 5 shows a detail of construction.

Usually a pair of luggage carriers is used on the running board of the automobile but, of course, if the piece of luggage is small and light only one carrier may be needed. In the embodiment of my invention shown in the drawings each luggage carrier comprises a frame having the stationary upright member 1 and which has at its lower end a slot 2 defined by the top arm 3 and the bottom arm 4 arranged substantially parallel to each other. In this embodiment of my invention the front upright 1 and the arms 3 and 4 are made of a single sheet of metal which is bent upon itself to form a deep channel with resulting side walls 5 and 6. These side walls at the inner end of the bottom arm 4 are bent to meet each other and are fastened together by a rivet 7. The walls of the top arm 3 are left open at the inner end for the purpose more fully hereinafter described. The slot 2 is adapted to receive the running board 8 of an automobile and the upper arm 3 has on the lower side thereof a shoe 9 to engage the upper surface of the running board. A movable shoe 10 carried by the bottom arm 4 is provided to engage the lower side of the running board and is arranged to be moved, as hereinafter explained, to clamp the running board in the slot. The means for moving the shoe 10 comprises, in this form of my invention, a shaft 11 which is threaded for a portion of its length and is mounted in the lower arm 4 between the side walls 5 and 6. The shaft 11 has formed on the outer end thereof a head 12 arranged to be engaged by a wrench shown dotted at 39 in Fig. 3. The block 13 is loosely mounted on the shaft 11 at the head 12 and the block 14 is threaded on the shaft. Extending from the blocks 13 and 14 at each side thereof are the pins 15 and 16 which extend through elongated openings 17 in the side walls 5 and 6. The links 18 are pivotally mounted at their upper ends on the lower side of the shoe 10 on the pins 19 which extend between the downwardly projecting webs 40 of the shoe and the links are mounted in like manner at their lower ends on the pins 15 and 16. When the shaft 11 is rotated the block 14 will be moved longitudinally of the shaft in relation to the block 13. When the shaft is turned so as to bring the blocks 13 and 14 closer together the links 18 will be moved to raise the shoe 10 and, in turn, when the shaft 11 is rotated in a reverse direction to separate the blocks 13 and 14 the links 18 will be moved to lower the shoe 10.

The frame of the luggage carrier also comprises an adjustable upright member 20 which has a base 21 telescoped between the side walls 5 and 6 in the upper arm 3. The inner end of the base 21 is provided with a block 22 which has extending outwardly from the sides thereof the guide pins 23 adapted to move in the elongated openings 23ᵃ in the side walls 5 and 6. Between the side walls 5 and 6 near the base of the arms 3 is fixed a block 24 through which extends and in which is loosely mounted the shaft 25 having a head 26 positioned at the outer side of the block 24 and arranged to be engaged by a wrench. The other end of the shaft 25 is threaded through the block 22 in the base 21. When the shaft 25 is rotated the block 22 in the base 21 and, in turn, the adjustable upright 20 is moved either closer to the stationary upright 1 or away therefrom, according to the direction in which the shaft is rotated.

The stationary upright 1 carries the outer side bracket 27 and the end bracket 28 which, in this form of my invention wherein a pair of carriers is used, are arranged at substantially right angles to one another and engage the outer side and end, respectively, of the piece of luggage being carried, the outlines of which are indicated by the broken lines in Figs. 1, 2 and 3. The adjustable upright 20 carries the inner side bracket 29 which engages the inner side of the luggage. Preferably, the brackets are provided with the inwardly turned flanges 30 upon which the luggage normally rests and whereby the luggage is held at a substantial distance away from the running board.

The outer edge of the upright 1 has the holes 31 extending therethrough and positioned so that a wrench may be inserted through them and moved into engagement with the heads 12 and 26 of the shafts 11 and 25, respectively, as indicated in Fig. 3. In order that the holes 31 may be closed to prevent the insertion of a wrench therethrough it is preferable that a sliding sleeve 32 be provided and which is held in place by lugs 33 projecting inwardly from the side walls 5 and 6. The sleeve has a hole 34 therethrough and is of a length so that it may be moved into a position wherein this hole registers with the lowermost hole 31 and the top of the sleeve is below the uppermost hole 31 in which position a wrench may be inserted to engage either of the heads 12 or 26 of the shafts. Also the sleeve may be moved to close the holes 31 in which position access cannot be had to the heads 12 and 26 and the shafts 11 and 25 cannot be rotated. The side wall 5 of the frame has the opening 35 and a portion 36 of the sleeve is preferably bent outwardly through this opening, as shown in Fig. 5. A staple 37 is fixed to the outside of the side wall 5 adjacent the opening 35 and a padlock 38 may be passed through the outer end of the portion 36 and the staple whereby the sleeve is locked in closed position.

The operation of my device is as follows: When a pair of carriers is used the shaft 11 of each carrier is rotated by a wrench, as described above, to lower the shoe 10 to allow the slot 2 to receive the running board 8 of the automobile. One of the carriers is then attached to the running board by turning the shaft 11 to raise the shoe 10 and to clamp the running board between it and the upper shoe 9. The other carrier is then attached to the running board in like manner at a distance from the first carrier which corresponds to the length of the piece of luggage to be carried. The luggage is then lifted into the brackets of the carrier and lowered onto the flanges 30. The shaft 25 is then rotated to move the adjustable upright 20 to hold the luggage securely in place and to clamp the luggage between the side brackets 27 and 29 so as to prevent its removal from the carrier. The sleeve 32 is then moved to close the holes 31 and is locked in closed position.

It will be noticed that the features of construction described above render the carrier quickly and easily attachable to the running board. The shoe 10 and the means controlled by the shaft 11 for raising and lowering it are so positioned and arranged whereby the movement of the shoe will be in a direction substantially parallel to the vertical axis of the shoe and, therefore, there is no turning or dragging of the shoe on the lower side of the running board.

It may be readily seen that a luggage carrier may be made in a number of different forms wherein the size, shape and arrangement of the parts may be varied within wide limits without deviating from the spirit of my invention as included in the claims below.

What I claim as new and desire to secure by Letters Patent, is:

1. A luggage carrier comprising a frame having a slot adapted to receive the running board of an automobile, a movable shoe, a shaft positioned between the side walls of said frame and arranged to extend substantially parallel to said slot, said shaft having a head arranged on the outer end thereof adapted to be engaged by a wrench whereby said shaft may be rotated, a block threaded on said shaft, a pin extending from said block through an elongated opening in the side wall of said frame, a link extending between said block and said shoe and said parts being positioned and arranged whereby when said shaft is rotated said shoe will be moved to clamp said running board in said slot.

2. A luggage carrier comprising a frame having a slot adapted to receive the running board of an automobile, a movable shoe, a shaft positioned between the side walls of said frame and arranged to extend substantially parallel to said slot, said shaft having a head arranged on the outer end thereof arranged to be engaged by a wrench whereby said shaft may be rotated, a block loosely mounted on said shaft at said head, a block threaded on said shaft, a pin extending from each of said blocks through elongated openings in the side walls of said frame, links extending between each of said blocks and said shoe whereby when said shaft is rotated said blocks will move said links whereby said shoe will be moved in a direction substantially parallel to its vertical axis to clamp said running board in said slot.

3. A luggage carrier comprising a frame having a slot therein defined by a pair of substantially parallel arms, a shaft in the bottom arm, a movable shoe, a block loosely mounted on said shaft, a block threaded on said shaft, a pin extending from the sides of each of said blocks through elongated openings in the side walls of said arms, links extending between each of said blocks and said shoe whereby when said shaft is rotated said blocks will move said links to raise said shoe whereby the running board of an automobile may be clamped in said slot.

4. A luggage carrier comprising a frame having a stationary member and an adjustable member, said members each having a block attached thereto, a shaft loosely mounted in one of said blocks and threaded in the other of said blocks, said shaft having a head arranged to be engaged by a wrench whereby said shaft will be rotated and said member and said shaft being arranged whereby by rotating said shaft said adjustable member may be moved to accommodate pieces of luggage of various sizes, and a sleeve carried by said frame and movable into position over said head to prevent engagement therewith by a wrench, and means whereby said sleeve may be locked in said position.

5. A luggage carrier comprising a frame, means for attaching said frame to the running board of an automobile, said frame having a stationary member and an adjustable member, each of said members including an upright section and a base section, said base sections being telescoped one within the other, a shaft threaded in the base of said adjustable member and otherwise arranged whereby when said shaft is rotated said adjustable member is moved relative to said stationary member, said shaft having at its outer end a head adapted to be engaged by a wrench, and said frame having a hole therethrough at a point corresponding to the position of the head of said shaft whereby a wrench may be inserted through said hole to engage said head.

In witness whereof I have signed my name to this specification.

JULIUS H. KINTZELE.